UNITED STATES PATENT OFFICE.

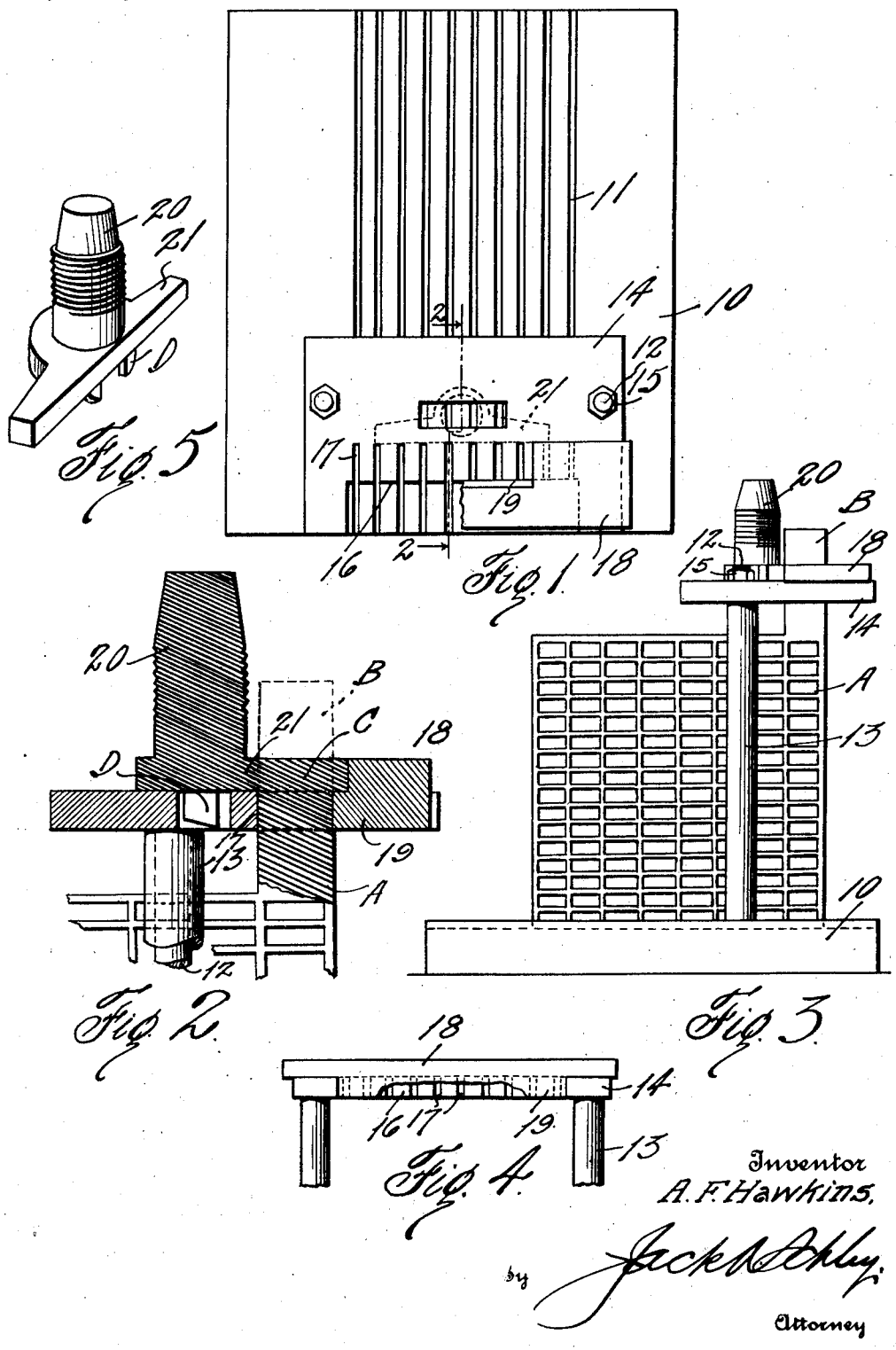

ALDA F. HAWKINS, OF FORT WORTH, TEXAS, ASSIGNOR TO STANDARD BATTERY MANUFACTURING COMPANY, OF FORT WORTH, TEXAS, A CORPORATION OF TEXAS.

BATTERY-PLATE AND TERMINAL CONNECTION.

1,339,061.   Specification of Letters Patent.   Patented May 4, 1920.

Appliction filed October 3, 1919. Serial No. 328,097.

*To all whom it may concern:*

Be it known that I, ALDA F. HAWKINS, a citizen of the United States, residing at Fort Worth, in the county of Tarrant and State of Texas, have invented certain new and useful Improvements in Battery-Plate and Terminal Connections, of which the following is a specification.

This invention relates to new and useful improvements in battery plate and terminal connections.

It has been customary to insert the lugs of the battery plates in slots in the terminal block and either upset the upper ends of the lugs or fuse the same by means of a torch. This leaves the lugs free to work loose and often break off, and further results in bad connections. Another objection to such a method is that the blocks must be cast with the correct number of slots and of the proper size, which requires a number of separate molds. Further in handling, the fingers between the slots are frequently bent, this causing delay in straightening the same.

The aim of my invention is to unite the plate lugs and the terminal in one integral or solid piece by melting the same together; and to do so in an adjustable mold capable of accommodating all sizes. By this arrangement the plates and terminal will be molded together and loose connections cannot be had and considerable time and expense will be saved.

In carrying out the invention the battery plates are assembled with their lugs extending up through a mold, the latter being adjusted to the size of terminal desired. A terminal post and flange are inserted in the mold in juxtaposition to the plate lugs. A size yoke is placed in the mold to co-act with the terminal flange in forming the terminal block. The flame of a torch is applied to the upstanding lugs and these are melted down and fused with the flange, additional metal being added if necessary. This forms the post, flange, block and plates into a single rigid casting.

The invention will be more readily understood from a reading of the following specification and by reference to the accompanying drawings, in which an example of the invention is shown, and wherein:

Figure 1 is a plan view of the mold used,

Fig. 2 is a side elevation of the same with plate and terminal therein,

Fig. 3 is a sectional view on line 2—2 of Fig. 1 with terminal and plate added,

Fig. 4 is a front elevation of upper end of mold, and

Fig. 5 is perspective view of terminal post and flange.

In the drawings the numeral 10 designates a base having parallel grooves 11 to receive battery plates. Posts 12 are mounted at each side of the grooves near the front end of the base. Sleeves 13 are fitted on the posts and terminate short of the upper ends of the latter. A molding plate 14 receives the upper ends of the posts and rests on the sleeves. This plate is secured in place by nuts 15 screw-threaded onto the upper ends of the posts.

The molding plate has a recess 16 in its front side from which slots 17 lead rearwardly. The slots are disposed directly over the grooves 11. A size yoke 18 rests on the plate 14 and has a depending boss 19 fitting in the recess 16 and closing the front ends of the slots at which point it protrudes slightly. The inner longitudinal dimension of the yoke controls the length of the terminal block, so that by using yokes with different inner dimensions, different lengths of blocks may be cast.

The yoke forms the front and sides of a molding area in which the slots 17 are confined. The terminal post 20 and its flange 21 having been previously casted are placed on the plate 14 so that the front edge of the flange alines with the rear ends of the slots 17 and said flange forms the rear side of the molding area.

In using the device battery plates A are placed uprightly between edges in the grooves 11 of the base and their lugs B extending up through the slots 17 and above the yoke. After the battery plates are placed in the mold, the yoke 18 of the proper size is placed in position as is shown in Fig. 2 and other figures. A torch or other flame is now applied to the upstanding lugs B, which are melted down so that the metal spreads over the molding area within the yoke. The front edge of the flange 21 is melted sufficiently to fuse the molten metal of the lugs therewith, thus forming a terminal block C as is shown in Fig. 2. If the lugs do not provide sufficient metal, more metal may be added.

It will be seen that the lugs B and the flange 21 are united and the battery plates and terminal post 20 are rigidly and permanently connected and all chance of loose connections eliminated. After the metal has congealed the yoke 18 is removed and the casting is lifted so that the projections D are raised above the plate 14, when the said casting and plates may be slid forward and removed. If the ends of the flange 21 should project they may be cut off and thus the same size of flange may be used on various widths of terminal blocks.

What I claim is:

In apparatus of the character described, a substantially horizontal base provided upon its upper face with spaced grooves extending through its forward portion, a pair of upstanding posts secured to the base upon opposite sides of the grooves, a substantially horizontal molding plate secured to the upper ends of the posts, said plate having spaced slots which have their forward ends open, said plate having an opening spaced from said slots and arranged rearwardly out of the slots, said molding plate serving to support the flange of a binding post with the lug of the binding post projecting into said opening, and a bar arranged upon the plate adjacent the slots and having recess means leading into the slots, said bar being adapted to be manually removed from the plate.

In testimony whereof I affix my signature.

ALDA F. HAWKINS.